United States Patent [19]

Strecker et al.

[11] Patent Number: 4,560,985
[45] Date of Patent: Dec. 24, 1985

[54] DUAL-COUNT, ROUND-ROBIN DISTRIBUTED ARBITRATION TECHNIQUE FOR SERIAL BUSES

[75] Inventors: William D. Strecker, Harvard, Mass.; John E. Buzynski, Windham, N.H.; David Thompson, Malden, Mass.

[73] Assignee: Digital Equipment Corp., Maynard, Mass.

[21] Appl. No.: 375,983

[22] Filed: May 7, 1982

[51] Int. Cl.[4] .......................... H04Q 9/00; H04J 15/00
[52] U.S. Cl. ..................................... 340/825.5; 370/85
[58] Field of Search ..................... 340/825.5, 825.05; 455/58, 67; 370/85

[56] References Cited

U.S. PATENT DOCUMENTS

| | | | |
|---|---|---|---|
| 4,337,465 | 6/1982 | Spracklen et al. | 370/85 |
| 4,385,382 | 5/1983 | Goss et al. | 370/85 |
| 4,395,710 | 7/1983 | Einolf, Jr. et al. | 370/85 |
| 4,466,096 | 8/1984 | Heins et al. | 340/825.5 |
| 4,494,113 | 1/1985 | Yamaoka et al. | 340/825.5 |

OTHER PUBLICATIONS

Network Systems Corp., *Systems Description: Series A Network Adapters,* Revision 01 (Oct. 1976), 6820 Shingle Creek Parkway, Brooklyn Center, Minn. Publication No: A01-0000-01.
Network Systems Corp., *Systems Description: Hyperchannel Network Adapters,* Revision 02, (Jan. 1978), 6820 Shingle Creek Parkway, Brooklyn Center, Minn., Publication No: A01-0000-02.
C. Weitzman, *Distributed Micro/Minicomputer Systems: Structure, Implementation and Application:* Prentice Hall, Inc., Englewood Cliffs, N.J. 1980, pp. 180–183.

*Primary Examiner*—Donald J. Yusko
*Attorney, Agent, or Firm*—Cesari and McKenna

[57] ABSTRACT

An arbitration technique for controlling access to a bit-serial bus by multiple nodes in a data processing network. Upon detection of no carrier on the bus (56), a node desiring access to the bus waits a predetermined number of quiet slots (60, 64), each slot being a predetermined interval. If that period elapses without another node's carrier being detected (64), the node desiring access is permitted to transmit (64, 68). For each node, two such delay-interval possibilities are provided, one high slot count (and, hence, low priority) and one low slot count (and, hence, high priority). The delay-interval selection for a node is switched from time to time on a round-robin basis so that all nodes get equal average priority. The high value of the delay interval is $N+M+1$ slots, where N is the node number and M is the maximum number of nodes allowed on the bus; the low value is $N+1$ slots. Initially, each node uses the former value. Upon unsuccessful contention for the bus, the delay-interval selection used next by the node depends on the number, LW, of the node which last won access to the bus. Upon detecting a carrier while waiting for access to the bus (i.e., losing arbitration to a higher-priority node), the node which is waiting for the bus compares its node number N to the number LW of the node which started transmitting (58). If LW was less than N, the node waiting for access uses a new waiting time of $N+1$ slots the next time the delay interval begins (62A); if LW was greater than N, the new delay interval value is $N+M+1$ slots (62B).

13 Claims, 2 Drawing Figures

DUAL-COUNT, ROUND-ROBIN DISTRIBUTED ARBITRATION TECHNIQUE FOR SERIAL BUSES

CROSS REFERENCE TO RELATED APPLICATIONS

The invention which is the subject of this Application is particularly useful in a system incorporating one or more of the inventions shown in the following commonly assigned applications, filed on even date herewith:

U.S. patent application Ser. No. 376,069, titled INTERFACE FOR SERIAL DATA COMMUNICATIONS LINK, in the names(s) of Robert E. Stewart, Robert Giggi and John E. Buzynski, U.S. patent application Ser. No. 375,984, titled METHOD AND APPARATUS FOR DIRECT MEMORY-TO-MEMORY INTERCOMPUTER COMMUNICATION, in the name(s) of William Strecker, Robert Stewart, and Samuel Fuller, and U.S. patent application Ser. No. 376,068 now U.S. Pat. No. 4,490,785 titled DUAL PATH BUS STRUCTURE FOR COMPUTER INTERCONNECTION, in the name(s) of William D. Strecker, David Thompson, and Richard Casabona.

To the extent necessary for understanding aspects of the present invention not fully explained herein, if any, and to the extent helpful to a more complete understanding of the utility or advantages of the present invention, the specifications of the aforementioned applications are hereby incorporated by reference, as though fully set forth herein.

FIELD OF THE INVENTION

This invention relates generally to the field of digital data processing systems. In particular, it relates to the interconnection of various units in such a system, in a network, and controlling the transfer of information among those units. Still more precisely, the invention relates to digital data processing networks wherein the units of such network are interconnected by a contention-arbitrated serial bus, and to controlling access to that bus by the various units or devices attached to it.

BACKGROUND OF THE INVENTION

A digital data processing system comprises at least a memory element, an input-output element and a processor element; and it may contain plural numbers of any or all of them. The memory element stores information in addressable storage locations. This information includes data and instructions for processing the data, including commands and responses. The processor element transfers information to and from the memory element, intreprets the incoming information as either data or instructions and processes data in accordance with the instructions. Input-output elements also communicate with the memory element(s) in order to transfer input data to and from the system and to obtain and process data from it.

Over the years, many different types of digital data processing systems have been developed. In recent years, developments have included computer networks wherein multiple memory elements, input-output elements and processor elements, often located at different positions, are enabled to communicate with each other. Among the types of information transfer schemes which are available, a general requirement is the use of a shared communications resource (i.e., channel or bus) which interconnects the various elements. With such sharing of the communications resource, network efficiency and utilization is strongly affected by the procedure for controlling access to the communications resource. Waiting time and other time consumed in overhead operations during which no transfer occurs detract from operational efficiency.

In general, a transmission between two units over a communications bus requires two steps, since more than one unit has the capability of originating such a connection. The first step is for the initiating unit to obtain control of the bus for some more or less defined interval. Once the selection step is completed, a second (or transfer) step is used to complete the transfer that is controlled by the selected initiating unit.

Obtaining control of the bus requires contending with other units desiring bus access, to arbitrate and determine which one will be selected. There are two principal generic approaches to arbitration. These are central arbitration and distributed arbitration. In central arbitration, a single, central priority circuit or device receives all requests for bus access and determines which requesting unit at any given time should be accorded the greatest priority and allowed to use the bus. Once that unit is selected, it is allowed to control the bus and effect the transfer. By contrast, in distributed arbitration, each unit connected to the bus is assigned a specific priority and each unit individually determines whether it has sufficient priority to obtain control of the bus when it desires to do so. If a unit of higher priority simultaneously seeks bus access, a device of lower priority must wait until some later time when it is the highest priority requester.

According to one such scheme described in U.S. Pat. No. 4,229,791, issued Oct. 21, 1980 for DISTRIBUTED ARBITRATION CIRCUITRY FOR DATA PROCESSING SYSTEM and assigned to the same assignee as the present invention, for example, the bus is provided with an assigned arbitration conductor. As each unit is prepared to effect an information exchange, it transmits a request signal onto that conductor; the unit then compares its request level with all other requests and only if there is no higher priority level request does it grant itself control of the bus.

That system is not workable, however, when the bus comprises a single bit-serial line, since there is no separate arbitration conductor. In such systems, one approach which has been adopted is referred to as carrier-sense multiple access with collision detection (CSMA/CD). In a CSMA/CD network, each device or unit connected to the network controls its own access to the bus (which is generally a coaxial cable). Each device which uses the bus connects to the cable through an interface which includes apparatus for transmitting a signal onto the channel as well as apparatus for receiving a signal placed thereon by another device's interface. Each interface includes circuitry for monitoring the channel and indicating whenever two devices are transmitting at the same time. When a device which is transmitting detects that another device is transmitting at the same time, the two devices stop transmitting and signal to their associated information sources (which are supplying the information to be transmitted) to stop transmitting. Both then retry transmission after the channel is clear.

Each device that wants to use (i.e., transmit on) the channel first "listens" to hear if any other unit is transmitting. If it detects no other transmission, the station (i.e., unit) starts its transmission, while simultaneously "listening" to the channel. If it detects that another station has started transmitting at the same time, both detect the collision and stop, as noted above. To avoid repeated collisions, each then waits briefly and tries again; various approaches exist for assigning to each unit a unique or suitable random delay to control the interval prior to retransmission. Such a system is illustrated, for example, in U.S. Pat. No. 4,063,220, issued Dec. 13, 1977 to Robert M. Metcalfe et al. The same assignee as the present invention also has copending herewith the following previously filed applications which relate to a CSMA/CD network:

U.S. patent application Ser. No. 267,394, filed May 26, 1981 by Jesse B. Lipcon and titled TRANSCEIVER FOR LOCAL NETWORK USING CARRIER-SENSE MULTIPLE ACCESS/COLLISION DETECTION.

U.S. patent application Ser. No. 292,003, filed Aug. 11, 1981 by Jesse B. Lipcon and titled APPARATUS FOR TESTING COLLISION-DETECT CIRCUITRY IN A TRANSCEIVER FOR A LOCAL NETWORK USING CARRIER-SENSE MULTIPLE ACCESS/COLLISION DETECTION.

U.S. patent application Ser. No. 292,004, filed Aug. 11, 1981 by Jesse B. Lipcon and titled RELIABILITY ENHANCEMENTS FOR TRANCEIVERS FOR LOCAL DATA NETWORKS USING CARRIER-SENSE MULTIPLE ACCESS/COLLISION DETECTION.

U.S. patent application Ser. No. 292,005, filed Aug. 11, 1981 by Jesse B. Lipcon and titled CURRENT SOURCE TRANSMITTER OUTPUT STAGE FOR TANSCEIVER FOR LOCAL DATA NETWORKS.

U.S. patent application Ser. No. 292,006, filed Aug. 11, 1981 by Jesse B. Lipcon and titled PRECISION SETTING OF CURRENTS AND REFERENCE VOLTAGES.

A slightly different system is marketed by Network Systems Corporation, 6820 Shingle Creek Parkway, Brookline Center, Minn. 55430, and is described in C. Weitzman, *Distributed Micro/Minicomputer Systems: Structure, Implementation and Application*, § 4.3 at 180–183, Prentice Hall, Inc. 1980. In that system, when directed to transmit, an adapter (i.e., the interface to the coaxial cable) contends for use of the channel. Three mechanisms are used within the contention procedure. The first mechanism is carrier sensing: If the coaxial cable is busy (i.e., a signal is detected), the unit will not initiate transmission. The second mechanism involves delaying transmission, following detection of coaxial cable availability, by a fixed interval. Each interface contains a hardware delay element which prevents transmission from the time it senses the "cable not busy" condition until the delay has elapsed. This allows a receiver time to respond promptly to a transmission on termination of the message, without having to contend for the bus again; it also allows an adapter that has access to the cable to continue to use it in a series of transmissions. This fixed delay is 4 nanoseconds per foot of cable length and, for a 1,000 foot bus, it is therefore 8 microseconds (since it is necessary to allow for the trailing edge of the transmission to travel the full length and for the leading edge of a response to also travel the full length). The third mechanism assigns a transmission priority to each adapter. Following the bus becoming not busy and the fixed delay having elapsed, each adapter generates a time pulse at which time it may initiate transmission on the bus and capture the bus for its use. The time following the end of the fixed delay at which a bus interface generates the time pulse enabling a transmission to start is referred to as "n-delay". For adaptor 0, n-delay is 0. For all other adaptors, n-delay is given by the following formula:

$$n\text{-delay} = (n-1 \text{ delay}) + (4 \text{ ns}) \text{ (distance between node } n-1 \text{ and node } n, \text{ in feet)}$$

If the bus is not busy and the two delay intervals have elapsed, an adapter immediately can initiate transmission. If collision occurs due to nearly simultaneous transmission by two adapters, it will be resolved during a retry, with the adapter having the higher priority being the one to get access.

Since priority designations for each adapter are predetermined in the Network Systems Corporation approach, one or more nodes may significantly dominate bus access time to the detriment of others. Indeed, it is only probabilistic, not deterministic, how long a node will have to wait for an opening. These are considerable drawbacks.

Accordingly, it is an object of the present invention to provide a distributed arbitration mechanism exhibiting greater fairness, wherein each node or unit connected to the bus has substantially equal average priority for obtaining bus access.

It is a further object of this invention to provide such an arbitration mechanism which is efficient and keeps retries to a minimum.

Yet another object of this invention is to provide a high reliability arbitration mechanism.

Still another object of this invention is to provide an arbitration mechanism which exhibits deterministic, not simply statistical behavior.

Yet another object is to provide an arbitration mechanism which permits a node to contend with two or more bus channels over which the node may communicate alternatively.

A further object of this invention is to provide an arbitration mechanism which satisfies one or more of the foregoing objectives and is relatively simple to implement.

SUMMARY OF THE INVENTION

To satisfy the foregoing objectives, the present invention provides a slotted CSMA/CD system, referred to as a dual-count, round-robin technique. For each node, two delay interval possibilities exist; the delay selection for each node is switched from time to time, on a round-robin basis, such that all nodes are given equal average priority.

As used herein, the term "node" refers to a device communicating over a bus and minimally includes a processor, memory and a bus interface. Other terms used to like effect herein are "device" and "unit".

The technique is based on a slot, or time interval, which is the maximum time for a node to sense that some other node (at any other physical location) is transmitting.

A node desiring to transmit (referred to below as an "initiating node") starts by examining the bus (or selected bus if two are available) to determine if a carrier is present (i.e., if another node is transmitting). As soon as the bus becomes idle (i.e., a carrier-to-no carrier state change is observed), the initiating node begins to wait for a unique number of "quiet" slots; the number is based on the address N of the node. The number of slots waited may have one of two values, N+1 or M+N+1, where M represents the maximum number of nodes allowed on the bus. The selection of the value is a function of history—i.e., it depends on the previous transmissions by other nodes. Initially, the waiting period is N+M+1 slots. If the waiting period elapses without another node's carrier having been detected, the initiating node has won arbitration and transmits its packet(s) if the node is not currently receiving data on the alternate path. If, however, carrier is detected, arbitration is lost and a count is taken of the number of slots waited before the carrier was detected. The number of slots waited (modulo M) minus one is the number of the node that transmitted—i.e., the node (LW) which last won arbitration. The initiating node compares its node number to LW and sets its waiting time value based on this comparison. If the number LW is less than its own node number (N), the new waiting value will be N+1 (i.e., the waiting value is low and the priority is high); if LW is greater than its own node number (N), the new waiting value will be N+M+1 (i.e., the waiting value is high and the priority is low). Alternatively, the comparison may be made more directly by determining the relative value of LW with respect to N.

Thus, in a saturation or near saturation condition wherein there is substantial demand for the bus and it is in nearly continuous use, collisions are minimized and access is on a round-robin basis. That is, each node waits its turn, allowing all nodes of higher node number to transmit before shifting to low priority. In other words, all nodes desiring access at a given instant are allowed to access the bus once before any node gets a second chance. When two nodes of equal priority level (high or low) wait at the same time, the one with the lower address (i.e., node number) wins. At light loading conditions wherein the bus is idle some part of the time, the system provides contention-type access for the bus—i.e., collision sensing with retries if needed.

Collisions can occur only when the bus has been idle and two nodes then begin arbitrating at times different (in numbers of slots) by the same amount as their addresses differ. When they both try to transmit at the same time, a collision results. The collision corrupts the packets and is detected by failure of the error correcting code transmitted with the packet to match the one calculated at the receiver (this may, for example be a cyclical redundancy check—i.e., CRC—code).

A timeout period is specified for situations wherein a node is unable to prevail in arbitration (i.e., an absence of carrier is never detected for the current arbitration count value). The expiration of an arbitration timer results in a response indicating a transmission failure. The timer, not shown, may be in the node's processor or in the interface.

An immediate acknowledgment is sent to verify the successful transmission and reception of packets. When a node successfully receives an information packet, it immediately acknowledges the receipt of that packet. Acknowledgment is performed by the transmission of a special packet that carries an acknowledgment type code. Arbitration for transmission of the acknowledgment packet is not required; the packet is transmitted as soon as the carrier of the transmission is removed from the physical channel. The acknowledgment must be returned before the carrier gap becomes long enough for another node (node 0 in this case being the critical one) to arbitrate for a quiet slot.

This invention is pointed out with particularity in the appended claims. The above and further objects and advantages of this invention may be further understood by referring to the following description of an embodiment taken in conjunction with the accompanying drawings.

DETAILED DESCRIPITON OF AN ILLUSTRATIVE EMBODIMENT

For improved reliability, it is possible to employ a multiple (e.g., dual) path bus structure whereby all nodes are connected by plural paths instead of just one path. The present arbitration scheme provides a node with the ability to contend with a second (or third, fourth, etc.) serial path over which that node may transmit or receive data. The scheme allows the arbitration process to continue in a controlled manner if the node is receiving data on the alternate path from which it is arbitrating. Once the reception and acknowledgement on the alternate path is complete, the node is allowed to transmit once the arbitration process has completed on the desired path. Each time a transmission is to be made, one of the two paths is selected. For the sake of economy, the majority of the hardware at each node may be time-shared between the two paths. As this complicates the arbitration process, the discussion below will be based on the presumption that such a dual-path, shared hardware bus is involved. It will readily be recognized where and how the disclosed embodiment may be simplified if only a single path bus is available, and how it may be extended to more than two paths.

Figure 1:
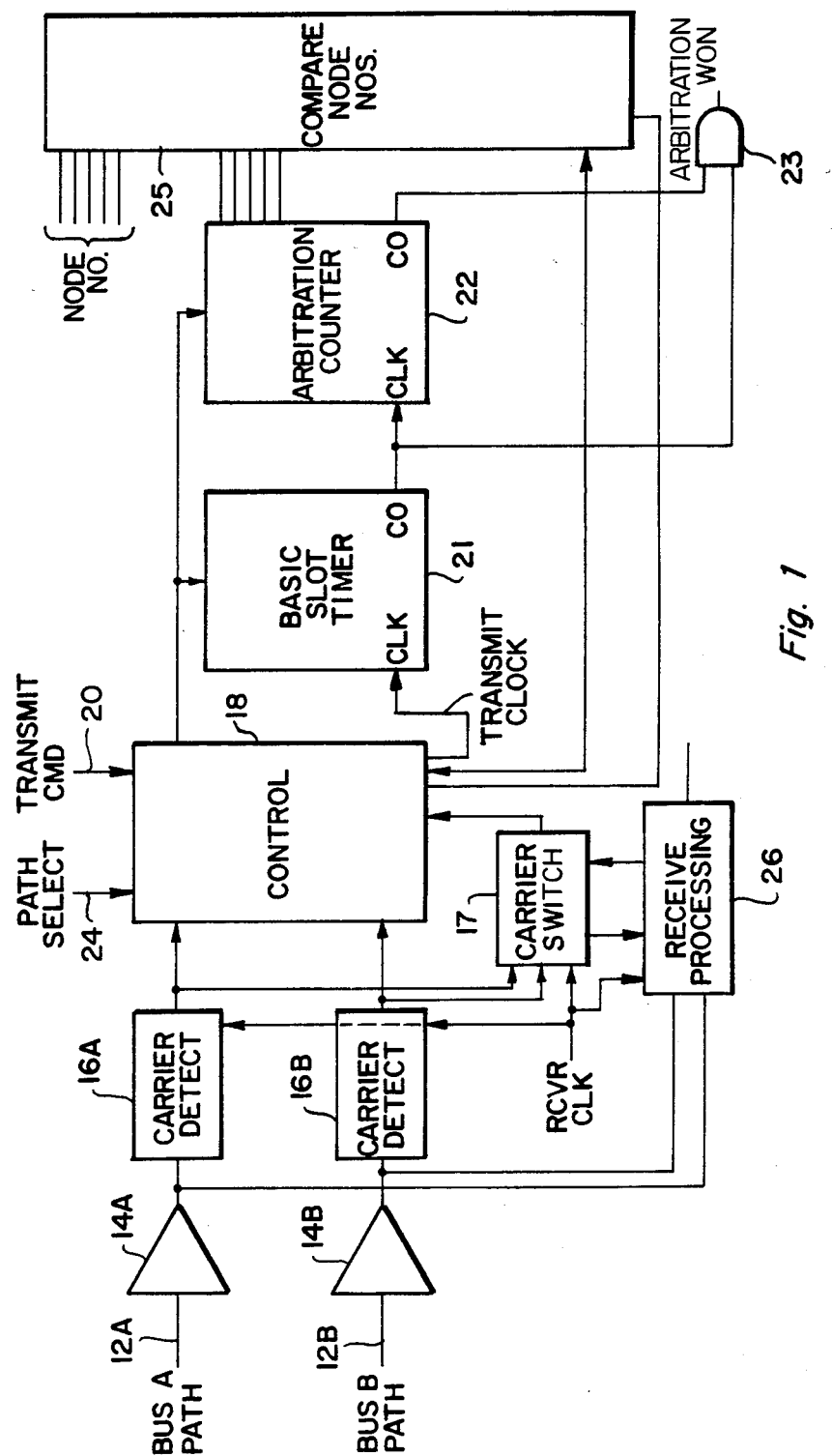
FIG. 1 is a block diagram of apparatus for performing bus arbitration as set forth herein.

The basic arbitration system of this invention is illustrated in FIG. 1. As shown there, arbitration is carried out with respect to two buses or bus paths, bus path A (12A) and bus path B (12B). Each bus path has its own line receiver (14A, 14B) and carrier detection circuit (16A, 16B). Dual path reception is implemented by monitoring the carrier detector 16A, 16B of both paths, looking for the initial presence of carrier on either path. (i.e., the off-to-on transition). The carrier switch 17 responds to the carrier detectors 16A, 16B and switches the receiver processin9 circuitry 26 to the path which first exhibits the initial presence of carrier. In the event that carrier assertions are detected simultaneously on both paths one of the paths will be selected by prior arrangement. The carrier switch 17 continues monitoring the selected path until the pocket header is decoded. Circuitry in the receiver processing section 26 decodes the destination address in the header; the carrier switch 17 continues to monitor that path if the packet is for that node, and switches away from that path if the packet is for another node. When the carrier switch 17 switches receive processing circuitry 26 away from a path, it goes to a state where it again looks for the initial presence of carrier. The carrier switch will not switch to a path that already has carrier asserted.

In general, the arbitration process is the same on both buses, so the remainder of the discussion will address the arbitration process for bus A only, it being understood that bus B is virtually a mirror image.

Figure 2:
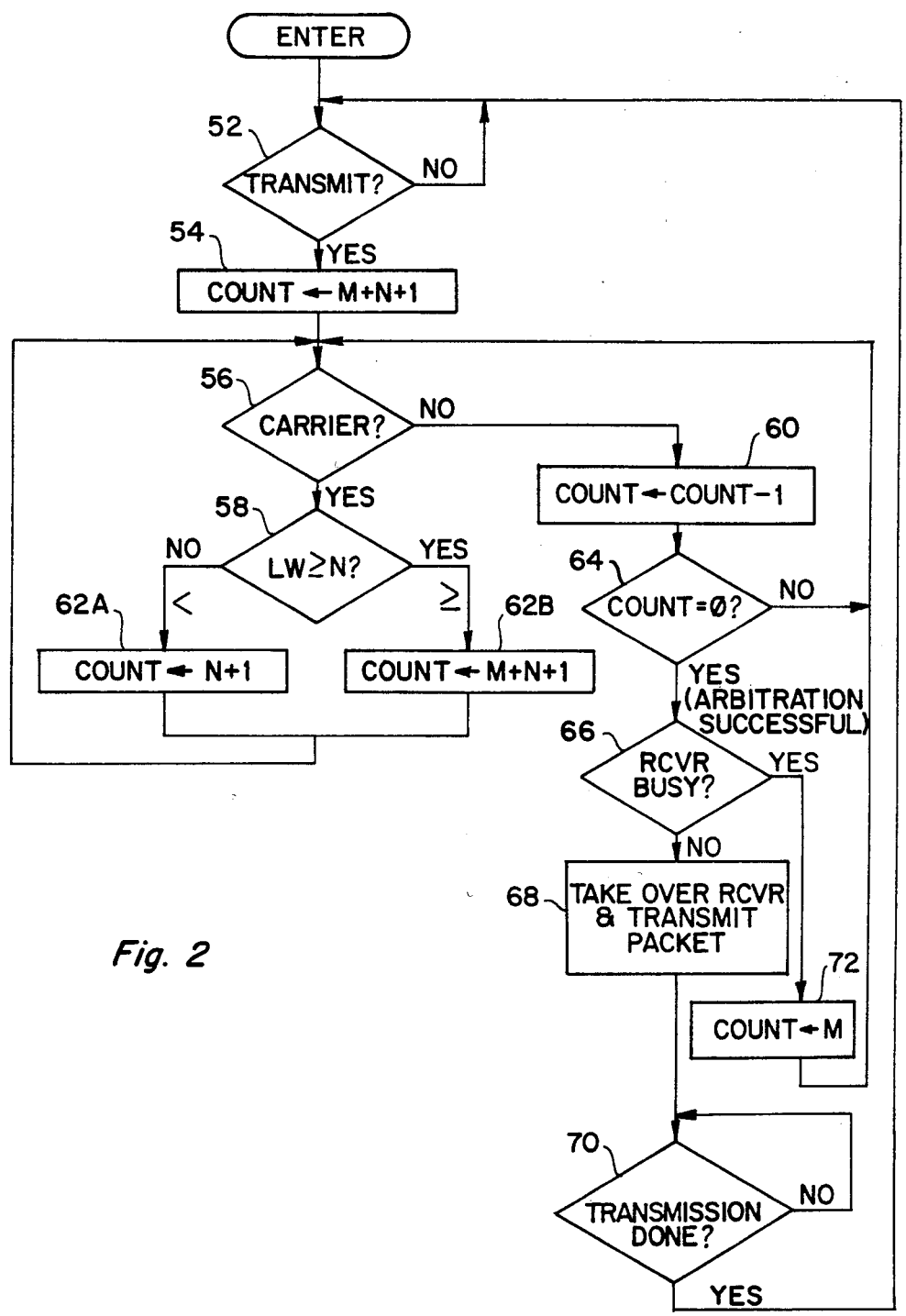
FIG. 2 is a flow chart illustrating the arbitration process described herein.

The arbitration process is described also with reference to a flow chart contained in FIG. 2. Thus, FIGS. 1 and 2 should be reviewed together.

With reference first to FIG. 2, the arbitration process starts, for a particular node, with a control circuit 18 in a first state 52. In that state, a transmit command line 20 is monitored and a determination is made as to whether the node desires to transmit. If not, it keeps monitoring the status of line 20 until a transmit command is detected. Once a transmit command is detected, the process enters state 54 wherein an arbitration counter 22 is loaded by control circuit 18 with a count (i.e., an arbitration count value, or ACV) equal to $M+N+1$, where M is the maximum number of nodes in the network and N is the number of that node. As described herein, arbitration counter 22 is a down counter.

The arbitration value count loaded into counter 22 is the number of consecutive slots that must be observed free of carrier before a node can transmit. The basic quiet slot interval is long enough to allow a receiving node to turn around and start transmitting an acknowledgment packet and to have the acknowledgment seen by another node trying to arbitrate on the same path before the quiet slot expires. Acknowledgment packets are the only packets transmitted over the bus without first arbitrating for control.

Arbitration slots are signalled by a carryout (CO) overflow of a basic slot timer 21, which indicates the passage of slot intervals as multiples of the transmit clock period.

Control circuit 18 next checks the state of the bus on which transmission is desired (indicated by the state of a path selection signal on line 24). State (or step) 56. If the carrier detector (16A or 16B) for the selected path indicates the presence of carrier thereon, that signifies that arbitration was won by another node, and control branches to step 58; otherwise, to step 60.

In step 58, a comparison is made between the number of the last node to win arbitration of the bus (LW) and the number of this node (N). The arbitration counter 22 is then loaded with a new arbitration count value, either $N+1$ (if LW is less than N) or $M+N+1$ (if LW is greater than or equal to N). Steps 62A, 62B. Following the reloading of the arbitration counter, step 56 is reentered.

Briefly, a node determines which node won the last arbitration (i.e., LW) as follows: At the beginning of the arbitration process, a node saves a copy of its own arbitration countdown value (e.g., in a node number comparison means 25). When arbitration ends by detection of a carrier, the remaining value in the arbitration counter, (modulo M) indicates whether the node number (LW) of the node which won the arbitration is higher or lower than the node number (N) of the node waiting to transmit. Observe, however, that this is true only when there is activity on a bus, since the de-assertion of carrier is the event which synchronizes each node's arbitration logic.

In step 60, the count indicated by arbitration counter 22 is decremented by one. Next, the counter's contents are tested for overflow, i.e., reaching zero. Step 64. A count of zero indicates arbitration was successful. This is signalled at the output of AND gate 23. If the count is not zero, arbitration was not successful and control reverts to step 56.

Assuming arbitration was successful, if common receive processing circuitry 26 is used by the node to process information received on both buses 12A and 12B (time-shared between the two), the transmitter (i.e., control circuitry 18) next checks to see whether the receiver is busy on one of the alternate buses. Step 66. If it is not, the receiver processing circuitry 26 is locked onto the selected transmit path and the transmission is begun. Step 68. The transmission is monitored (step 70), and when done, control reverts to the entry point of the arbitration process.

If the receiver circuitry was found busy in step 66, the arbitration counter is loaded with a count of M, step 72, and arbitration continues at step 56.

The receiver circuitry 26 is indicated as busy when one of the following occurs: (1) carrier has been detected on the alternate path and it has not yet been determined that the transmission is destined for another node; (2) a packet or message is being received for the node on the alternate path; or (3) a packet has been received and the transmitter is in the process of sending an acknowledgment packet.

When alternate bus paths are available, the shared receiver circuitry is locked onto the selected path during the entirety of a transmission and until an acknowledgment is received or an acknowledgment timer (not shown) expires.

The node that transmitted the information packet must attempt to receive the acknowedgment packet as soon as it is finished transmitting. If the acknowledgment is not received within an acknowledgment time-out period, the transmission is considered to have failed. This is termed a No Response (NO RSP) acknowledgment. A NO RSP acknowledgment occurs when the intended node did not correctly receive the packet and therefore did not acknowledge it or the acknowledgment packet was corrupted. The minimum arbitration timeout interval is a function of the implementation.

NO RSP's may occur as the result of bus noise (causing CRC comparison failure), simultaneous transmission by multiple nodes (i.e., a collision, which is signalled by a failure of CRC comparisons), or inability of a node to receive the packet on the bus path on which it was transmitted, such as due to a malfunction of path or interface hardware.

There are two types of acknowledgment to successfully received packets. The first is positive acknowledgment (ACK), which indicates that the reception was successful; that is, the transmitted packet is available to the host computer in the receiving node. The second is negative acknowledgment (NAK), which indicates that the packet was correctly received, but that the interface was unable to buffer it (i.e., the packet was discarded). Although the actual buffering is implementation-specific, the concept of a congested interface that is unable to process a packet applies to all implementations. The probability of congestion in interfaces should be minimized, as it reduces the amount of bandwidth available to all nodes on the interconnection media.

Each acknowledgment message is checked to insure that it was received from the node to which the triggering transmission was sent. For details of the packet format used for this purpose, see the aforementioned U.S. patent application Ser. No. 375,984.

If the transmission results in either a NO RSP or a NAK acknowledgment, retransmission must be attempted according to the following algorithm: For NO RSP, if fewer than a predetermined number (e.g., 64) of consecutive NO RSP's on the packet have occurred, retransmission should be attempted. For NAK, if fewer than another predetermined number (e.g., 128) of NAK's on the packet have occurred (not necessarily consecutively), retransmission should be attempted.

A "coin-flip" decision must be made when the packet is available for retransmission. If the result if TRUE, retransmission is attempted. If FALSE, a delay time interval is waited and the decision repeated. The delay time value should be a minimum of M slot times. The normally selected slot time value is fixed at, e.g., 800 nanoseconds, which implies a minimum delay interval of 12.8 microseconds for a 16 node network. The maximum time is unlimited, though throughput considerations usually limit the maximum. The delay need not be consistent. This allows for software or firmware controlled retry with non-constant service latencies (such as in a polled system). The first decision has special properties. If, at the time of the decision to retransmit, synchronism of the arbiter is maintained after the transmission (that is, it remains synchronized to the last deassertion of carrier on the bus), transmission may occur when the arbitration is completed. However, if synchronism was lost, a single delay interval should be waited before the retransmission decision is made. This prevents consistent arbitration violation on successful retransmit decisions. If an interface always takes a constant amount of time to determine that it must retransmit, collisions with the transmissions of another node (for which the difference in mode numbers times slots equals the retransmit decision time) will occur consistently. The random choice should be equal probability success/failure. Pseudo-random implementations are acceptable with a minimum of 16 bits in the generator.

This scheme is designed to break deadlocks. The selection of retry limits was calculated from simulation results to meet the following criteria: The mistaking of failure in a correctly functioning system (due to congestion) should occur no more than once per year with the factors typically encountered in heavily loaded clusters (i.e., networks).

A path that has failed in retransmission need not be retried for the failing packet. Rather, it is appropriate to retry it at whatever frequency is used for configuration update polling.

The foregoing description is limited to a single specific embodiment of this invention, but it will be apparent that this invention can be practiced in data processing systems having diverse basic construction or in systems using different interval circuitry or design while nevertheless achieving some or all of the foregoiong objects and advantages of this invention. Therefore, it is the object of the appended claims to cover all such variations, modifictions and obvious improvements as come within the true spirit and scope of this invention.

What is claimed as new and desired to be secured by Letters Patent of the United States is:

1. In a network for interconnecting a plurality of computer nodes via a bit-serial bus, the improvement comprising arbitration means for controlling access to the bus by ascribing to each node a priority value and permitting access by that node which is requesting access and which has the highest priority value, and wherein the arbitration means assigns priority values such that under conditions of substantial demand for bus access, the average of the priority values is the same for each node.

2. In a network for interconnecting a plurality of computer nodes via a bit-serial bus, each node including apparatus for controlling access to the bus comprising:

A. carrier detector means for detecting the presence or absence of transmission signals on the bus;

B. arbitration counter means responsive to the carrier detector means for counting the passage of time slots of predetermined duration, commencing with detection of an absence of transmission signals on the bus;

C. means for providing to the arbitration counter means an arbitration count value (ACV) having one of two possible values, a relatively low value and a relatively high value;

D. control means responsive to the carrier detector means, for inhibiting the arbitration counter means from counting upon detection of the presence of a transmission signal on the bus;

E. the arbitration counter means being adapted to compare the number of elapsed time slots with the arbitration count value and upon finding the number of elapsed time slots equal to the ACV for the node, providing a signal for enabling the node to begin transmitting on the bus; and F. means responsive to the inhibiting of the arbitration counter for providing to the arbitration counter a new ACV.

3. The apparatus of claim 2 wherein each node is assigned a unique node number, N, and both of the available ACV's are a function of the node number.

4. The apparatus of claim 3 wherein there are a maximum of M nodes allowed in the network and the two possible ACV's for each node are N+1 and N+M+1.

5. The apparatus of claim 4 wherein when a node desires to transmit, the means for providing an ACV initially selects the ACV N+M+1.

6. The apparatus of any of claims 3-5 wherein the means responsive to the inhibiting of the arbitration counter includes
   i. means for determining the number (LW) of the node whose transmission signal caused the inhibiting,
   ii. means for comparing N to LW, and
   iii. means for choosing the new ACV as a function of the results of the comparison.

7. The apparatus of claim 6 wherein the means for choosing the new ACV sets the new ACV to the relatively low value if LW was less than N and to the relatively high value if LW was greater than or equal to N.

8. In a network for interconnecting a plurality of computer nodes via a bit-serial bus, a method for controlling access to the bus by said nodes, comprising the steps of:

A. assigning to each node an arbitration count value (ACV), said ACV being the number of time slots of predetermined length during which the bus must be inactive prior to the node being allowed to begin transmitting on the bus;

B. each node being identified by a node number;

C. when a node desires to transmit, initializing its arbitration count value to a first, relatively high value; and D. each node which desires to transmit monitoring the bus for the transmit carrier of other nodes while counting the number of time slots the bus is inactive and
   i. upon detecting another node's carrier prior to expiration of a number of time slots equal to the node's ACV,
      a. determining whether the node number (LW) of the node whose carrier was detected, was greater or less than the node number, N, of the node which desires to transmit, b. if LW was less than N, setting to a relatively low value the ACV of the node desiring to transmit, c. if LW was greater than or equal to N, setting to a relatively high value the ACV of the node desiring to transmit, and d. reentering step D. hereof, and ii upon counting out a number of time slots equal to the node's ACV without detecting another node's carrier, allowing the node which desires to transmit to do so.

9. The method of claim 8 wherein the relativlely low value of the ACV is N+1.

10. The method of claim 8 or claim 9 wherein the relatively high value of the ACV is N+M+1, M being the maximum number of nodes in the network.

11. The method of claim 8 wherein, to accommodate the use of multiple bus paths and shared receiver hardware for communicating thereover, upon counting out a number of time slots equal to the node's ACV without detecting another node's carrier, the node which desires to transmit is allowed to do so only if the shared receiver hardware is not engaged on another bus path; and if the shared receiver hardware is so engaged, setting the ACV to equal the maximum number of nodes in the network.

12. A method of determining which node, among a plurality of nodes interconnected by a common communications bus and contending for access to the bus, is to obtain access to the bus, the method comprising the steps of:

A. for each such node, associating therewith two unique possible priority values, a low possible priority value within a low priority range and a high possible priority value within a high priority range, the possible priority values being assigned such that the relative priority of a given node's low possible priority value with respect to those of the other nodes is the same as the relative priority of the given node's high possible priority value with respect to those of the other nodes;

B. assigning to each node one of its possible priority values in accordance with at least one possible priority value of the node that was granted access to the bus in a given previous contention for access, the "previous winning node", each node whose possible priorities are lower than those of the previous winning node being assigned its high possible priority value, and each node whose possible priorities are higher than or equal to those of the previous winning node being assigned its low priority value; and C. granting access to the bus to the node assigned the highest priority value among the nodes contending for access to the bus.

13. Associated with each node connected to a common communications bus that interconnects a plurality of nodes, an arbitration apparatus for controlling access of the associated node to the bus, the arbitration apparatus comprising:

A. means for determining which node has obtained access to the bus at a preselected time;

B. means for assigning to the associated node, in accordance with the determining made by the determining means, one of two unique possible priority values selected from among a low possible priority value within a low priority range and a high possible relative priority value within a high priority range, the priority of a given node's low possible priority value with respect to those of the other nodes being the same as the relative priority of the given node's high possible priority value with respect to those of the other nodes, the associated node being assigned its low possible priority value if its possible priority values are higher than or equal to those of the node that was granted access in a given access determination and being assigned the high possible priority level if its possible priority levels are lower than those of the node that was granted control in the given control determination; and C. means for granting the associated node access to the bus if the assigned priority value of no other node requiring access to the bus is higher than the assigned priority value of the associated node.

* * * * *

REEXAMINATION CERTIFICATE (2267th)
United States Patent [19]
Strecker et al.

[11] B1 4,560,985

[45] Certificate Issued Apr. 12, 1994

[54] DUAL-COUNT, ROUND-ROBIN DISTRIBUTED ARBITRATION TECHNIQUE FOR SERIAL BUSES

[75] Inventors: William D. Strecker, Harvard, Mass.; John E. Buzynski, Windham, N.H.; David Thompson, Malden, Mass.

[73] Assignee: Digital Equipment Corporation, Maynard, Mass.

Reexamination Request:
No. 90/002,967, Feb. 24, 1993

Reexamination Certificate for:
Patent No.: 4,560,985
Issued: May 7, 1982
Appl. No.: 375,983
Filed: Dec. 24, 1985

[51] Int. Cl.$^5$ .............. H04Q 9/00; H04J 15/00
[52] U.S. Cl. .................. 340/825.5; 370/85.3; 370/85.6
[58] Field of Search .......... 370/85.2, 85.3, 85.6, 370/85.9; 455/58.2, 67.1; 340/825.05, 825.5

[56] References Cited

U.S. PATENT DOCUMENTS

| | | | |
|---|---|---|---|
| 3,573,856 | 4/1971 | Best | 340/172.5 |
| 3,665,404 | 5/1972 | Werner | 340/172.5 |
| 3,676,860 | 7/1972 | Collier et al. | 340/172.5 |
| 3,711,835 | 1/1973 | Jaegar et al. | 340/172.5 |
| 3,798,591 | 3/1974 | Phillips et al. | 340/172.5 |
| 4,009,470 | 2/1977 | Danilenko et al. | 340/172.5 |
| 4,096,571 | 6/1978 | Vander Mey | 364/200 |
| 4,130,864 | 12/1978 | Schlotterer | 364/200 |
| 4,232,294 | 11/1980 | Burke et al. | 340/147 |
| 4,320,502 | 3/1982 | DeVeer | 370/85 |
| 4,337,465 | 6/1982 | Spracklen et al. | 340/825.03 |
| 4,363,096 | 12/1982 | Comfort et al. | 364/200 |
| 4,374,413 | 2/1983 | Comfort et al. | 364/200 |
| 4,374,414 | 2/1983 | Comfort et al. | 364/200 |
| 4,376,975 | 3/1983 | Comfort et al. | 364/200 |
| 4,385,382 | 5/1983 | Goss et al. | 370/96 |
| 4,395,710 | 7/1983 | Einolf, Jr. et al. | 340/825.5 |
| 4,400,771 | 8/1983 | Suzuki et al. | 364/200 |
| 4,466,096 | 8/1984 | Heins et al. | 370/85 |
| 4,494,113 | 1/1985 | Yamaoka et al. | 340/825.5 |
| 4,503,533 | 3/1987 | Tobagi et al. | 370/85 |
| 4,541,043 | 9/1985 | Ballegeer et al. | 364/200 |
| 4,633,394 | 12/1986 | Georgiou et al. | 364/200 |

FOREIGN PATENT DOCUMENTS

| | | |
|---|---|---|
| 909957 | 9/1972 | Canada . |
| 954232 | 9/1974 | Canada . |
| 83302414.4 | 2/1985 | European Pat. Off. . |
| 1314180 | 11/1969 | United Kingdom . |

OTHER PUBLICATIONS

Network Systems Corp., "Systems Description: Series A Network Adapters," Revision 01 (Oct. 1976) 6820 Shingle Creek Parkway, Brooklyn Center, Minn. Publication No. A01-0000-01.

Network System Corp., "Systems Discription: Hyperchannel Network Adapters," Revision 02, (Jan. 1978), 6820 Shingle Creek Parkway, Brooklyn Center, Minn. Publication No. A01-0000-02.

Network Systems Corp., "A400 General Minicomputer Adapter: General Design Specifications", Specification No. 42000201.

Network Systems Corp., "Common Processor Adapter Functions: General Design Specification," Revision A, Specification No. 42001501.

C. Weitzman, "Distributed Micro/Minicomputer Systems: Structure Implementation and Applications:" Prentice Hall, inc., Englewood Cliffs, N.J. 1980 pp. 180–183.

*Primary Examiner*—Michael Horabik

[57] ABSTRACT

An arbitration technique for controlling access to a bit-serial bus by multiple nodes in a data processing network. Upon detection of no carrier on the bus (56), a node desiring access to the bus waits a predetermined number of quiet slots (60, 64), each slot being a predetermined interval. If that period elapses without another node's carrier being detected (64), the node desiring access is permitted to transmit (64, 68). For each node. two such delay-interval possiblilites are provided, one high slot count (and, hence, low priority) and one low slot count (and, hence, high prioirty). The delay-inter-

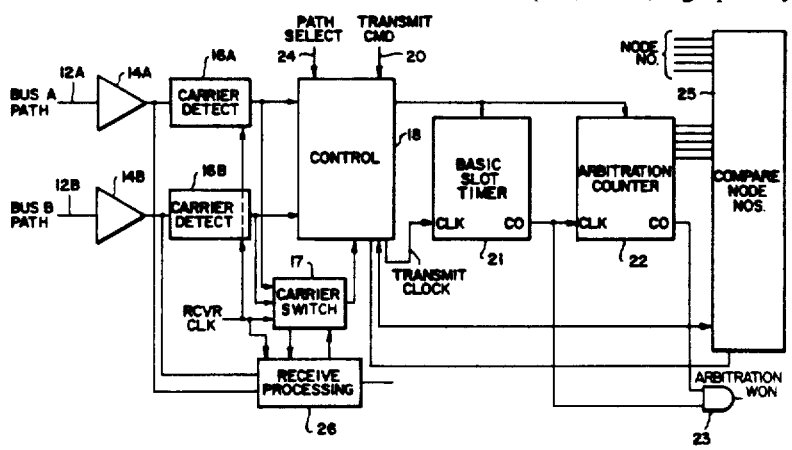

val selection for a node is switched from time to time on a round-robin basis so that all nodes get equal average priority. The high value of the delay interval is $N+M+1$ slots, where N is the node number and M is the maximum number of nodes allowed on the bus; the low value is $N+1$ slots. Initially, each node uses the former value. Upon unsuccesful contention for the bus, the delay-interval selection used next by the node depends on the number, LW, of the node which last won access to the bus. Upon detecting a carrier while waiting for access to the bus (i.e. losing arbitration to a higher-priority node), the node which is waiting for the bus compares its node number N to the number LW of the nodel which started transmitting (58). If LW was less than N, the node waiting for access uses a new waiting time of $N+1$ slots the next time the delay interval beguns (62); if LW was greater than N, the new delay interval value is $N+M+1$ slots (62B).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is on longer a part of the patent; matter printed in italics indicates additions made to the patent.

AS A RESULT OF REEXAMINATION, IT HAS BEEN DETERMINED THAT:

The patentability of claims 2-13 are confirmed.

Claim 1 is determined to be patentable as amended.

1. In a network for interconnecting a plurality of computer nodes via a bit-serial bus, the improvement comprising arbitration means for controlling access to the bus by ascribing [to each node] a priority value *to only those nodes which are requesting access to the bus* and permitting access by that node which is requesting access and which has the highest priority value, and wherein the arbitration means assigns priority values such that under conditions of substantial demand for bus access, the average of the priority values is the same for each node *which is requesting access to the bus.*

* * * * *